(12) United States Patent
He et al.

(10) Patent No.: US 7,212,216 B2
(45) Date of Patent: May 1, 2007

(54) PERSPECTIVE VIEW PRIMARY FLIGHT DISPLAY WITH TERRAIN-TRACING LINES AND METHOD

(75) Inventors: Gang He, Morristown, NJ (US); Thea L. Feyereisen, Hudson, WI (US); Ivan S. Wyatt, Scottsdale, AZ (US)

(73) Assignee: Honeywell International, Inc., Morristown, NJ (US)

( * ) Notice: Subject to any disclaimer, the term of this patent is extended or adjusted under 35 U.S.C. 154(b) by 122 days.

(21) Appl. No.: 11/174,271

(22) Filed: Jun. 29, 2005

(65) Prior Publication Data

US 2007/0002078 A1 Jan. 4, 2007

(51) Int. Cl.
*G06T 17/00* (2006.01)
(52) U.S. Cl. .......................... 345/629; 345/632; 701/3; 701/201
(58) Field of Classification Search ................ 345/629, 345/632, 952; 701/3, 201
See application file for complete search history.

(56) References Cited

U.S. PATENT DOCUMENTS

| | | | | |
|---|---|---|---|---|
| 4,040,005 A | * | 8/1977 | Melvin ........................ 340/973 |
| 4,247,843 A | * | 1/1981 | Miller et al. ................ 340/973 |
| 4,368,517 A | * | 1/1983 | Lovering ..................... 701/16 |
| 4,952,922 A | * | 8/1990 | Griffin et al. ............... 345/421 |
| 5,745,863 A | * | 4/1998 | Uhlenhop et al. ............ 701/14 |
| 5,798,713 A | * | 8/1998 | Viebahn et al. ............. 340/974 |
| 5,929,860 A | * | 7/1999 | Hoppe ........................ 345/419 |
| 6,002,347 A | * | 12/1999 | Daly et al. .................. 340/963 |
| 6,317,059 B1 | * | 11/2001 | Purpus et al. ............... 340/974 |
| 6,496,760 B1 | | 12/2002 | Michaelson et al. |
| 6,653,947 B2 | * | 11/2003 | Dwyer et al. ............... 340/970 |
| 6,678,588 B2 | * | 1/2004 | He ............................... 701/3 |
| 6,738,011 B1 | * | 5/2004 | Evans ...................... 342/26 C |
| 6,782,312 B2 | * | 8/2004 | He ............................... 701/3 |
| 2002/0140578 A1 | | 10/2002 | Prica |
| 2004/0083038 A1 | | 4/2004 | He |

FOREIGN PATENT DOCUMENTS

WO   WO 2005/057133 A1   6/2005

OTHER PUBLICATIONS

Prinzel et al., "NASA Synthetic Vision EGE Flight Test", 1999, NASA Langley Research Center.*
Tuttle et al., "Terminal Area Operations with Enhanced and Synthetic Vision: Experience in the Boeing Technology Demonstrator", Apr. 2003, pp. 136-145.*
PCT International Search Report PCT/US2006/025459, filed Oct. 31, 2006.

* cited by examiner

*Primary Examiner*—Almis R. Jankus
(74) *Attorney, Agent, or Firm*—Ingrassia Fisher & Lorenz

(57) ABSTRACT

A display system and method are provided for a vehicle that includes a processor and a display. The processor is adapted to receive terrain data and navigation data operable, in response thereto, to supply one or more image rendering display commands. The display device is coupled to receive the image rendering display commands and operable, in response thereto, to simultaneously render (i) a perspective view image representative of the terrain data and the navigation data and (ii) one or more terrain-tracing lines.

20 Claims, 2 Drawing Sheets

PERSPECTIVE VIEW PRIMARY FLIGHT DISPLAY WITH TERRAIN-TRACING LINES AND METHOD

TECHNICAL FIELD

The present invention relates to a display for a vehicle and, more particularly, to a system and method for displaying distance or time information in a forward-looking perspective display.

BACKGROUND

Modern multifunctional map displays, particularly those used in vehicles, such as aircraft, watercraft, or spacecraft, are capable of displaying a considerable amount of information such as vehicle position, attitude, navigation, target, and terrain information. Most modern displays additionally allow a vehicle flight plan to be displayed from different views, either a lateral view, a vertical view, or perspective views which can be displayed individually or simultaneously on the same display. The lateral view, generally known as a lateral map display, is basically a top-view of the aircraft flight plan, and may include, for example, a top-view aircraft symbol, waypoint symbols, line segments that interconnect the waypoint symbols, and range rings. The lateral map may also include various map features including, for example, weather information, terrain information, political boundaries, and navigation aids. The terrain information may include situational awareness (SA) terrain, as well as terrain cautions and warnings which, among other things, may indicate where the aircraft may potentially impact terrain.

The perspective view provides a three-dimensional view of the vehicle flight plan. The perspective view display may include one or more of the above-mentioned features that are displayed on the lateral map, including the terrain information. Although the present method of displaying terrain data in the perspective view display is effective, it does suffer certain drawbacks. For example, in some instances, the display may not provide sufficient information for a vehicle operator to determine a distance between the vehicle and a point or an object on the terrain. Consequently, the object may mistakenly appear to be close to or far away from the aircraft In other instances, a three-dimensional translucent plane having a fixed range with respect to a current position of the vehicle is laid on top of terrain and into a flight space. In these cases, the planes intrude into the visual space of the display, are always shown in the display, and may obstruct the operator's view of other information on the same display.

Hence, there is a need for a display system and method that addresses one or more of the above-noted drawbacks. Namely, there is a need for a display system and method that accurately displays distance of objects in the perspective view terrain relative to the aircraft without obstructing an operator's view of other information that may be on the same display. The present invention addresses one or more of these needs.

BRIEF SUMMARY

In one exemplary embodiment, a display system is provided that includes a processor and a display device. The processor is adapted to receive terrain data and navigation data operable, in response thereto, to supply one or more image rendering display commands. The display device is coupled to receive the image rendering display commands and is operable, in response thereto, to simultaneously render (i) a perspective view image representative of the terrain data and navigation data and (ii) one or more terrain-tracing lines. The perspective view image includes terrain having a profile determined by elevations of the terrain. Each terrain-tracing line (i) extends at least partially across the terrain, (ii) represents at least one of a ground-referenced range to a fixed location on the terrain and a vehicle referenced range from the vehicle to a fixed range away from the vehicle, and (iii) conforms with the terrain profile. The processor is configured to selectively display at least one of the ground-referenced range and the vehicle-referenced range.

In another exemplary embodiment, a display system is provided that includes a processor and a display device. The processor is adapted to receive terrain data and navigation data operable, in response thereto, to supply one or more image rendering display commands. The display device is coupled to receive the image rendering display commands and is operable, in response thereto, to simultaneously render (i) a perspective view image representative of the terrain data and navigation data and (ii) one or more terrain-tracing lines. The perspective view image includes terrain having a profile determined by elevations of the terrain. Each terrain-tracing line (i) extends at least partially across the terrain, (ii) represents a range from the vehicle to a location on the terrain, (iii) conforms with the terrain profile, (iv) has a line configuration, wherein the line configuration is selected from the group consisting of at least solid, dashed, opaque, semi-transparent, thick, thin, shaded, and colored, and (v) comprises a first segment and a second segment. The first segment has a first line configuration and the second segment has a second line configuration In another exemplary embodiment, a method of displaying terrain on an aircraft flight deck display system is provided. The method includes the steps of processing terrain data and navigation data, and simultaneously displaying (i) a three-dimensional perspective view image representative of the terrain data and the navigation data (ii) one or more terrain-tracing lines. The perspective view image includes terrain having a profile determined by elevations of the terrain, and each terrain-tracing line (i) extends at least partially across the terrain, (ii) represents at least one of a ground-referenced range to a fixed location on the terrain and a vehicle-referenced range from the vehicle to a fixed range away from the vehicle, and (iii) conforms with the terrain profile. The method also includes the step of selectively displaying at least one of the ground-referenced range and the vehicle-referenced range.

BRIEF DESCRIPTION OF THE DRAWINGS

The present invention will hereinafter be described in conjunction with the appended drawing figures, wherein like numerals denote like elements, and in which.

DETAILED DESCRIPTION

Figure 1:
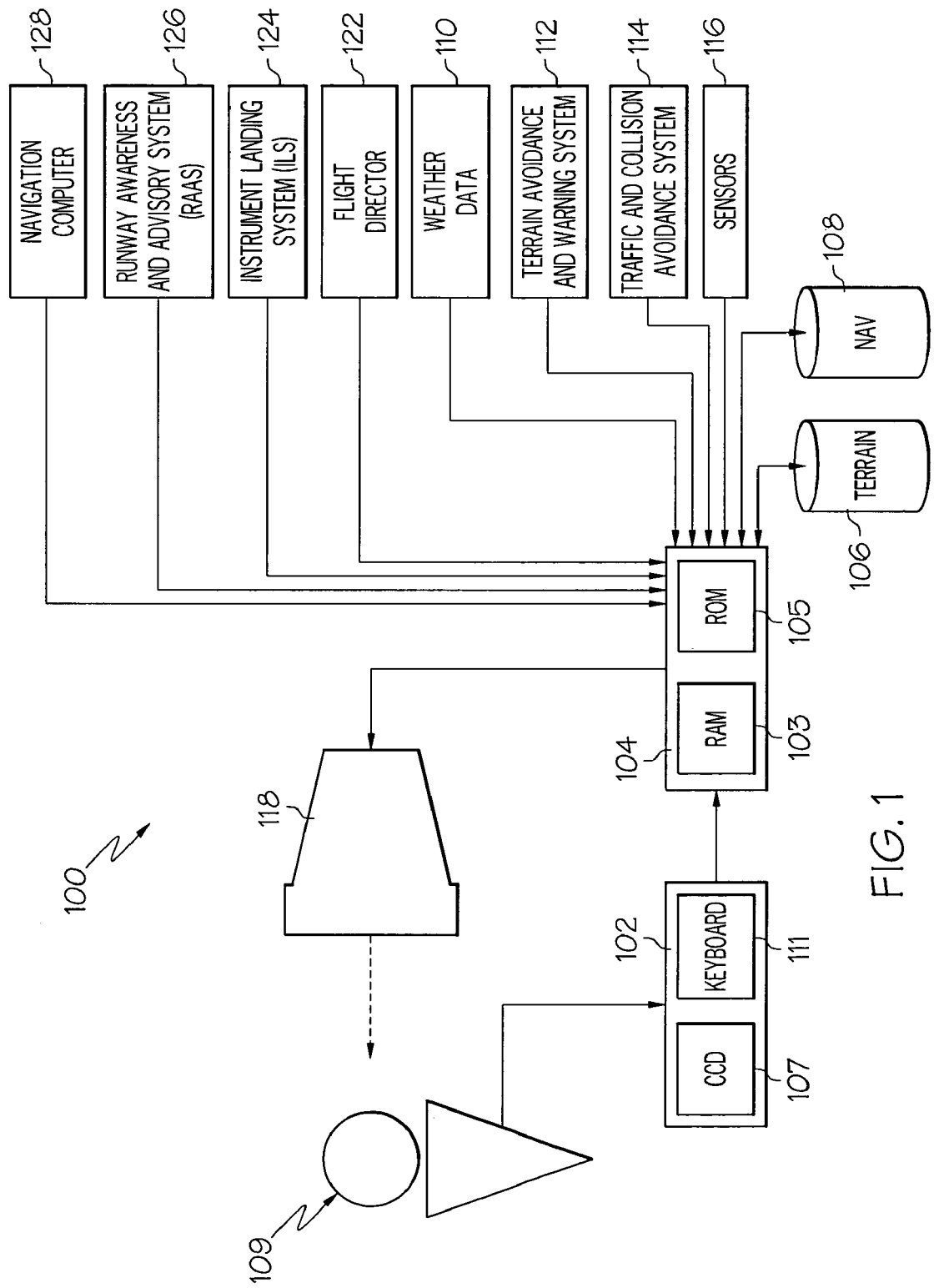
FIG. 1 is a functional block diagram of a flight deck display system according to one embodiment of the present invention.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. Additionally, although the invention is described below as being implemented in aircraft, it will be appreciated that any other manned or unmanned vehicles, such as watercraft and spacecraft may alternatively incorporate the invention.

The present invention may be described in terms of functional block diagrams and various processing steps. It should be appreciated that such functional blocks may be realized in many different forms of hardware, firmware, and/or software components configured to perform the various functions. For example, the present invention may employ various integrated circuit components, e.g., memory elements, digital signal processing elements, look-up tables, and the like, which may carry out a variety of functions under the control of one or more microprocessors or other control devices. Such general techniques are known to those skilled in the art and are not described in detail herein. Moreover, it should be understood that the exemplary process illustrated may include additional or fewer steps or may be performed in the context of a larger processing scheme. Furthermore, the various methods presented in the drawing, figures, or the specification are not to be construed as limiting the order in which the individual processing steps may be performed. It should be appreciated that the particular implementations shown and described herein are illustrative of the invention and its best mode and are not intended to otherwise limit the scope of the invention in any way.

Turning now to the description, and with reference to FIG. 1, an exemplary flight deck display system will be described. The system 100 includes a user interface 102, a processor 104, one or more terrain databases 106, one or more navigation databases 108, a source of weather data 110, a terrain avoidance and warning system (TAWS) 112, a traffic and collision avoidance system (TCAS) 114, various sensors 116, and a display device 118. The user interface 102 is in operable communication with the processor 104 and is configured to receive input from a user 109 (e.g., a pilot) and, in response to the user input, supply command signals to the processor 104. The user interface 102 may be any one, or combination, of various known user interface devices including, but not limited to, a cursor control device (CCD) 107, such as a mouse, a trackball, or joystick, and/or a keyboard, one or more buttons, switches, or knobs. In the depicted embodiment, the user interface 102 includes a CCD 107 and a keyboard 111. The user 109 uses the CCD 107 to, among other things, move a cursor symbol on the display screen (see FIG. 2), and may use the keyboard 111 to, among other things, input textual data.

The processor 104 is in operable communication with the terrain databases 106, the navigation databases 108, and the display device 118, and is coupled to receive various types of inertial data from the various sensors 116, and various other avionics-related data from one or more other external systems, which are briefly described further below. The processor 104 is configured, in response to the inertial data, to selectively retrieve terrain data from one or more of the terrain databases 106 and navigation data from one or more of the navigation databases 108, and to supply appropriate display commands to the display device 118, so that the retrieved terrain and navigation data are appropriately displayed on the display device 118. As FIG. 1 additionally shows, the processor 104 is also in operable communication with the source of weather data 110, the TAWS 112, the TCAS 114, and is additionally configured to supply appropriate display commands to the display device 118 so that the avionics data, weather data 110, data from the TAWS 112, data from the TCAS 114, and data from the previously mentioned external systems may also be selectively displayed on the display device 118. The preferred manner in which the terrain and navigation data are displayed on the display will be described in more detail further below. Before doing so, however, a brief description of the processor 104, the data sources 106-114, and the display device 118, at least in the depicted embodiment, will be provided.

The processor 104 may be any one of numerous known general-purpose microprocessors or an application specific processor that operates in response to program instructions. In the depicted embodiment, the processor 104 includes on-board RAM (random access memory) 103, and on-board ROM (read only memory) 105. The program instructions that control the processor 104 may be stored in either or both the RAM 103 and the ROM 105. For example, the operating system software may be stored in the ROM 105, whereas various operating mode software routines and various operational parameters may be stored in the RAM 103. It will be appreciated that this is merely exemplary of one scheme for storing operating system software and software routines, and that various other storage schemes may be implemented. It will also be appreciated that the processor 104 may be implemented using various other circuits, not just a programmable processor. For example, digital logic circuits and analog signal processing circuits could also be used.

The terrain databases 106 include various types of data, including elevation data, representative of the terrain over which the aircraft is flying, and the navigation databases 108 include various types of navigation-related data. These navigation-related data include various flight plan related data such as, for example, waypoints, distances between waypoints, headings between waypoints, data related to different airports, navigational aids, obstructions, special use airspace, political boundaries, communication frequencies, and aircraf approach information. It will be appreciated that, although the terrain databases 106 and the navigation databases 108 are, for clarity and convenience, shown as being stored separate from the processor 104, all or portions of either or both of these databases 106, 108 could be loaded into the on-board RAM 103, or integrally formed as part of the processor 104, and/or RAM 103, and/or ROM 105. The terrain databases 106 and navigation databases 108 could also be part of a device or system that is physically separate from the display system 100.

The avionics data that is supplied from the sensors 116 includes data representative of the state of the aircraft such as, for example, aircraft speed, altitude, and heading. The weather data 108 supplied to the processor 104 is representative of at least the location and type of various weather cells. The data supplied from the TCAS 114 includes data representative of other aircraft in the vicinity, which may include, for example, speed, direction, altitude, and altitude trend. In a preferred embodiment, the processor 104, in response to the TCAS data, supplies appropriate display commands to the display device 118 such that a graphic representation of each aircraft in the vicinity is displayed on the display device 118. The TAWS 112 supplies data representative of the location of terrain that may be a threat to the aircraft. The processor 104, in response to the TAWS data, preferably supplies appropriate display commands to the display device 118 such that the potential threat terrain is displayed in various colors depending on the level of threat. For example, red is used for warnings (immediate danger), yellow is used for cautions (possible danger), and green is used for terrain that is not a threat. It will be appreciated that these colors and number of threat levels are merely exemplary, and that other colors and different numbers of threat levels can be provided as a matter of choice.

As was previously alluded to, one or more other external systems (or subsystems) may also provide avionics-related data to the processor 104 for display on the display device 118. In the depicted embodiment, these external systems include a flight director 122, an instrument landing system (ILS) 124, a runway awareness and advisory system (RAAS) 126, and a navigation computer 128. The flight director 122, as is generally known, supplies command data representative of commands for piloting the aircraft in response to flight crew entered data, or various inertial and avionics data received from external systems. The command data supplied by the flight director 122 may be supplied to the processor 104 and displayed on the display device 118 for use by the pilot 109, or the data may be supplied to an autopilot (not illustrated). The autopilot, in turn, produces appropriate control signals which are applied to the aircraft's flight control surfaces to cause the aircraft to fly in accordance with the flight crew entered data, or the inertial and avionics data.

The ILS 124 is a radio navigation system that provides aircraft with horizontal and vertical guidance just before and during landing and, at certain fixed points, indicates the distance to the reference point of landing. The system includes ground-based transmitters (not illustrated) that transmit radio frequency signals. The ILS 124 on board the aircraft receives these signals and supplies appropriate data to the processor for display of, for example, an ILS feather (not illustrated in FIG. 1) on the display device 118. The LS feather represents two signals, a localizer signal that is used to provide lateral guidance, and a glide slope signal that is used for vertical guidance.

The RAAS 126 provides improved situational awareness to help lower the probability of runway incursions by providing timely aural advisories to the flight crew during taxi, takeoff, final approach, landing and rollout. The RAAS 126 uses GPS data to determine aircraft position and compares aircraft position to airport location data stored in the navigation database 108. Based on these comparisons, the RAAS 126, if necessary, issues appropriate aural advisories. The aural advisories the RAAS 126 may issue inform the pilot 109, among other things of when the aircraft is approaching a runway—either on the ground or from the air, when the aircraft has entered and is aligned with a runway, when the runway is not long enough for the particular aircraft, the distance remaining to the end of the runway as the aircraft is landing or during a rejected takeoff, when the pilot 109 inadvertently begins to take off from a taxiway, and when an aircraft has been immobile on a runway for an extended time.

The navigation computer 128 is used, among other things, to allow the pilot 109 to program a flight plan from one destination to another. The navigation computer 128 may be in operable communication with the flight director 122. As was mentioned above, the flight director 122 may be used to automatically fly, or assist the pilot 109 in flying, the programmed route. The navigation computer 128 is in operable communication with various databases including, for example, the terrain database 106, and the navigation database 108. The processor 104 may receive the programmed flight plan data from the navigation computer 128 and cause programmed flight plan, or at least portions thereof, to be displayed on the display device 118.

The display device 118 is used to display various images and data, in both a graphical and a textual format, and to supply visual feedback to the user 109 in response to the user input commands supplied by the user 109 to the user interface 102. It will be appreciated that the display device 118 may be any one of numerous known displays suitable for rendering image and/or text data in a format viewable by the user 109. Non-limiting examples of such displays include various cathode ray tube (CRT) displays, and various flat panel displays such as, various types of LCD (liquid crystal display) and TFT (thin film transistor) displays. The display may additionally be based on a panel mounted display, a HUD projection, or any known technology. In an exemplary embodiment, display element 104 includes a panel display. To provide a more complete description of the method that is implemented by the flight management system 100, a general description of the display device 118 and its layout will now be provided.

Figure 2:
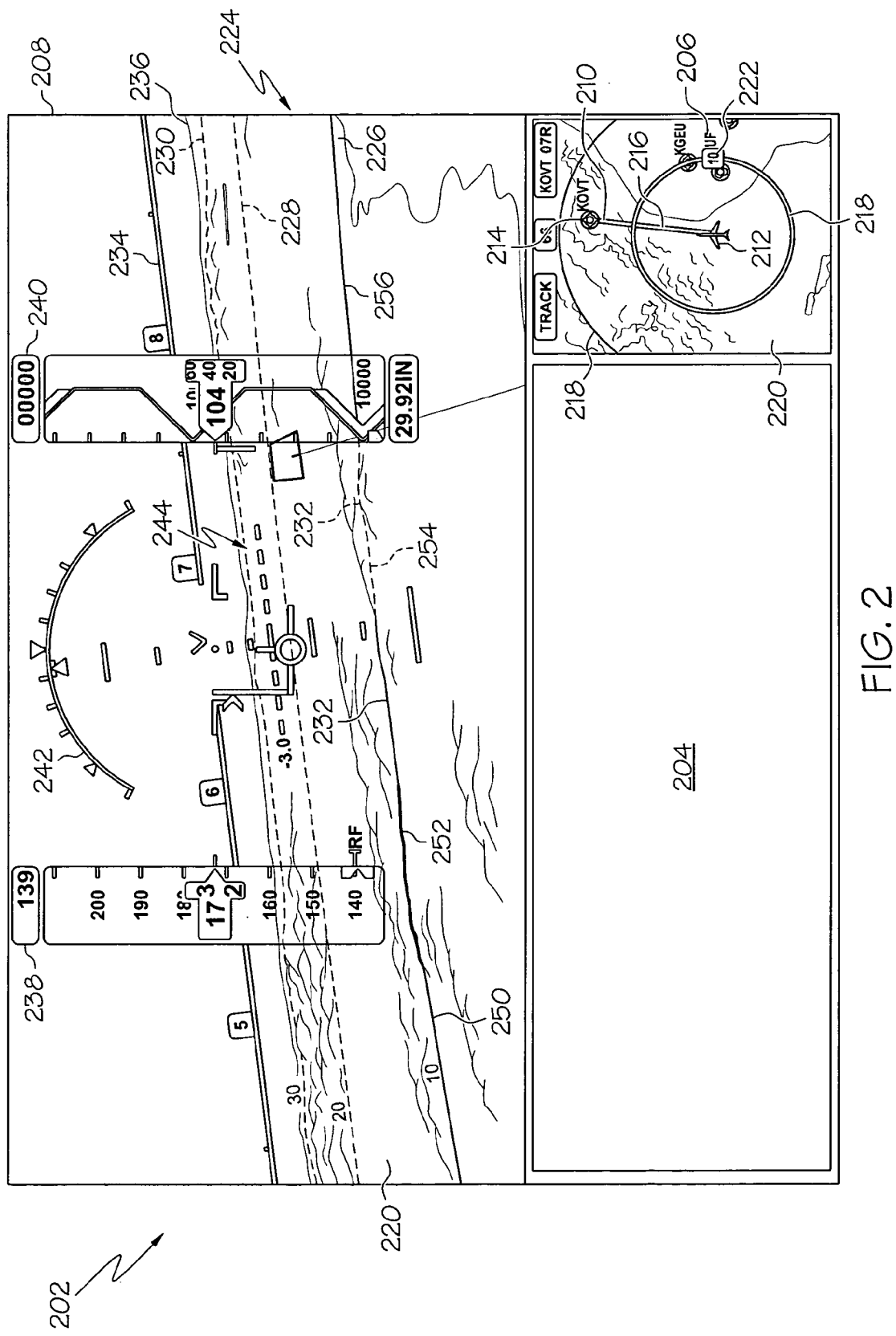
FIG. 2 is a simplified representation of an exemplary display screen that may be used in the system of FIG. 1, which shows the overall layout of the display screen, and on which is various graphical and textual images are simultaneously displayed.

With reference to FIG. 2, it seen that the display device 118 includes a display area 202 in which multiple graphical and textual images may be simultaneously displayed, preferably in different sections of the display area 202. For example, general flight-related data 204, a lateral situation display 206, and a perspective view display 208 may be displayed simultaneously, alone, or in various combinations, in various sections of the display area 202. The general flight-related data 204 that is displayed may include various types of data related to the flight plan of the aircraft. Such data includes, but is not limited to, the flight identifier, route iteration number, a waypoint list and associated information, such as bearing and time to arrive, just to name a few. It will be appreciated that the general flight-related data 204 may additionally include various types of data associated with various types of flight hazards. Examples of these, and other types of data that may be displayed, are disclosed in U.S. Pat. No. 6,289,277, entitled "Interfaces for Planning Vehicle Routes," which is assigned to the assignee of the present application, and the entirety of which is hereby incorporated by reference.

The lateral situation display 206 includes a top-view aircraft symbol 212, and at least portions of a flight plan 210 represented by one or more waypoint symbols 214 and interconnecting line segments 216, and one or more range rings 218. The lateral situation display 206 also preferably includes various map features including, but not limited to, a lateral two-dimensional view of terrain 220 below the flight plan, political boundaries, and navigation aids. It will be appreciated that for clarity only the terrain 220 is shown in FIG. 2. The range rings 218 may be used to indicate sequential ranges, such as fixed distance or time ranges needed to travel from the top-view aircraft symbol 212 to another position on the terrain 220, or any other information that may be useful to a pilot In the illustrated embodiment, the range rings 218 indicate distances from the aircraft symbol 212. The range ring 218 includes a range indicator 222, which displays the lateral distance from the aircraft's present position to the position on the lateral map 202 that corresponds to the range ring 218 (e.g., 10 nautical miles). It will be appreciated that the value of the range indicator 222 may be set manually or automatically, via a non-illustrated pop-up menu.

The perspective view display 208 also provides a view of the terrain 220, including, for example, a terrain profile that is determined by elevations of the terrain. The perspective view display 208 may provide the view of the terrain 220 below the flight plan and/or ahead of the aircraft, and may show the terrain 220 and various other symbols and/or data (discussed further below) as either a two-dimensional profile vertical situation view or a perspective situation view. In the depicted embodiment, the terrain 220 is displayed ahead of the aircraft and is shown as a three-dimensional perspective view 224. It will be appreciated that the lateral situation display 206 and the perspective view display 208 preferably use the same scale so that the pilot can easily orient the present aircraft position to either section of the display area 202. It will additionally be appreciated that the processor 104 may implement any one of numerous types of image rendering methods to process terrain data from the terrain database 106 and render the three-dimensional perspective view 224. One such exemplary method is disclosed in U.S. patent application Ser. No. 10/282,709, entitled "Method for Producing 3D Perspective View Avionics Terrain Displays," which is assigned to the assignee of the present invention, and the entirety of which is hereby incorporated by reference.

In addition to displaying the three-dimensional perspective view 224 of the terrain 220, the perspective view display 208 may also simultaneously display terrain-tracing lines 226, 228, 230. In one exemplary embodiment, the terrain-tracing lines 226, 228, 230 correspond with the range rings 218 shown in the lateral situation display 206. Preferably, the terrain-tracing lines 226, 228, 230 selectively appear on the perspective view display 208 as either representing ground-referenced or aircraft-referenced sequential ranges.

Terrain-tracing lines 226, 228, 230 that are ground-referenced are fixed to a location on the terrain 220. In such case, the terrain-tracing lines 226, 228, 230 may be spatially positioned and may represent distances from the aircraft to a destination depicted on the terrain 220, and the spatial position is determined by the current position of the aircraft. Alternatively, the terrain-tracing lines may represent an estimated time of arrival to an object on the terrain 220 or an amount of time needed to reach an object depicted in the terrain 220. Terrain-tracing lines 226, 228, 230 that are vehicle- or aircraft-referenced indicate a fixed range away from the vehicle. In the embodiment depicted in FIG. 2, the terrain-tracing lines 226, 228, 230 represent 10 nautical miles, 20 nautical miles, and 30 nautical miles, respectively, from the aircraft. Alternatively, these types of terrain-tracing lines 226, 228, 230 may represent an estimated time of arrival to an object on the terrain 220 or an amount of time needed to reach an object depicted in the terrain 220.

The terrain-tracing lines 226, 228, 230 may be any line configuration, including, but not limited to, solid, thick, thin, dashed, opaque, semi-transparent, shading, or colored, or combinations thereof. The particular configuration of the lines 226, 228, 230 may represent a particular range of the sequential ranges. Each of the terrain-tracing lines 226, 228, 230 may comprise multiple segments 250, 252, 254, 256 that have similar or different configurations. For example, a terrain-tracing line may have a segment 250 that appears lighter, more transparent, or thinner than another segment 252 of the line. In one exemplary embodiment, the variously configured segments are used to reduce visual clutter of the display 208. In this regard, a segment that extends in front of an object can appear to be invisible, while other segments may be visible. In another exemplary embodiment, one line segment is a first configuration or color that represents safe areas and another line segment is a second configuration or color that indicates potential terrain hazards.

Preferably, the terrain-tracing lines 226, 228, 230 extend at least partially across the perspective view display 208 conforming to the terrain profile. In one exemplary embodiment, the terrain-tracing lines 226, 228, 230 change as the aircraft moves. For example, the terrain-tracing lines 226, 228, 230 trace the contour of the terrain 220 and may appear to have curves. As shown in FIG. 2, the terrain 220 may include elevated objects 232, such as hills, and the terrain-tracing lines 226, 228, 230 preferably outline the elevated object 232. Alternatively, in areas in which the terrain 220 does not have contours, such as in areas having ocean or flat terrains, the terrain-tracing lines 226, 228, 230 appear to be straight lines. Thus, the terrain-tracing lines 226, 228, 230 may have any suitable shape. Although the terrain-tracing lines 226, 228, 230 are depicted as flush with the terrain 220, the terrain-tracing lines 226, 228, 230 may alternatively be slightly elevated a predetermined distance above the terrain 220. The terrain-tracing lines 226, 228, 230 may be dynamic so that they conform to the terrain 220 profile as the aircraft moves. Thus, every point of the terrain-tracing lines 226, 228, 230 changes as the terrain profile changes.

Additionally, it will be appreciated that the terrain-tracing lines 226, 228, 230 may be continuously displayed on the perspective view display 208 during operation. Alternatively, the terrain-tracing lines 226, 228, 230 may be displayed automatically upon the arrival of an event, such as upon the approach of potential threat terrain determined from the TAWS data, or upon the arrival at a user-selected point of interest, such as a landmark, building, or structure of interest.

The perspective view display 208 may also include conventional primary flight display symbology. In particular, the navigation data may include information such as vehicle and heading data and the display may further include range lines representative of the vehicle attitude and heading data. For example, as shown in FIG. 2, the display 208 may include a heading indicator line 234 that extends across the display 208. Preferably, the heading indicator line 234 is depicted slightly above the horizon 236 and has a configuration that is different than the configuration of the terrain-tracing lines 226, 228, 230. The display 208 may also include other conventional symbology, including, but not limited to, an air speed tape 238, an altitude tape 240, a bank indicator 242, and a compass 244.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A display system for a vehicle, comprising:
   a processor adapted to receive terrain data and navigation data operable, in response thereto, to supply one or more image rendering display commands; and
   a display device coupled to receive the image rendering display commands and operable, in response thereto, to simultaneously render (i) a perspective view image representative of the terrain data and the navigation data and (ii) one or more terrain-tracing lines,
wherein the perspective view image includes terrain having a profile that is determined by elevations of the terrain,
wherein each terrain-tracing line (i) extends at least partially across the terrain, (ii) represents at least one of a ground-referenced range to a fixed location on the terrain and a vehicle-referenced range from the vehicle to a fixed range away from the vehicle, and (iii) conforms with the terrain profile, and
wherein the processor is configured to selectively display at least one of the ground-referenced range and the vehicle-referenced range.

2. The system of claim 1, wherein at least one of the ground-referenced range and the vehicle-referenced range is an estimated time of arrival at a point on the terrain.

3. The system of claim 1, wherein at least one of the ground-referenced range and the vehicle-referenced range is an amount of time needed to travel from the vehicle to a point on the terrain.

4. The system of claim 1, wherein the terrain-tracing lines appear on the image upon an occurrence of an event.

5. The system of claim 1, wherein the terrain-tracing lines appear on the image upon an arrival at a user-selected point of interest.

6. The system of claim 1, wherein each terrain-tracing line has a line configuration, wherein the line configuration is selected from the group consisting of at least solid, dashed, opaque, semi-transparent, thick, thin, shaded, and colored.

7. The system of claim 6, wherein each terrain-tracing line comprises a first segment and a second segment.

8. The system of claim 7, wherein the first segment has a first line configuration and the second segment has a second line configuration.

9. The system of claim 6, wherein the one or more terrain-tracing lines includes a first terrain-tracing line and a second terrain-tracing line, and the first terrain-tracing line has a first line configuration and the second terrain-tracing line has a second line configuration.

10. The system of claim 9, wherein the first and second terrain-tracing lines each represent sequential, different fixed ranges.

11. The system of claim 1, wherein the navigation data includes vehicle and heading data and the image further includes range lines representative of the vehicle attitude and heading data.

12. The system of claim 1, wherein the each terrain-tracing line is displayed flush with the terrain.

13. The system of claim 1, wherein the each terrain-tracing line is displayed at a predetermined height above the terrain.

14. The system of claim 1, wherein the system is implemented into a vehicle selected from the group of vehicles comprising at least an aircraft, underwater craft, and a spacecraft.

15. A display system for a vehicle, comprising:
a processor adapted to receive terrain data and navigation data operable, in response thereto, to supply one or more image rendering display commands; and
a display device coupled to receive the image rendering display commands and operable, in response thereto, to simultaneously render (i) a perspective view image representative of the terrain data and the navigation data and (ii) one or more terrain-tracing lines,
wherein the perspective view image includes terrain having a profile that is determined by elevations of the terrain,
wherein each terrain-tracing line (i) extends at least partially across the terrain, (ii) represents a range from the vehicle to a location on the terrain, (iii) conforms with the terrain profile, (iv) has a line configuration, wherein the line configuration is selected from the group consisting of at least solid, dashed, opaque, semitransparent, thick, thin, shaded, and colored, and (v) comprises a first segment and a second segment, and
wherein the first segment has a first line configuration and the second segment has a second line configuration.

16. A method of displaying terrain on an aircraft flight deck display system, the method comprising the steps of:
processing terrain data and navigation data; and
simultaneously displaying (i) a three-dimensional perspective view image representative of the terrain data and navigation data and (ii) one or more terrain-tracing lines,
wherein the perspective view image includes the image terrain having a profile determined by elevations of the terrain,
wherein each terrain-tracing line (i) extends at least partially across the terrain, (ii) represents at least one of a ground-referenced range to a fixed location on the terrain and a vehicle-referenced range from the vehicle to a fixed range away from the vehicle, and (iii) conforms with the terrain profile, and
selectively displaying at least one of the ground-referenced range and the vehicle-referenced range.

17. The method of claim 16, further comprising:
using the processed terrain data to dynamically generate each terrain-tracing line.

18. The method of claim 16, wherein each terrain-tracing line has a line configuration and the line configuration is selected from the group consisting of at least solid, dashed, opaque, transparent, thick, thin, shaded and colored.

19. The method of claim 18, wherein the one or more terrain-tracing lines includes a first terrain-tracing line and a second terrain-tracing line, wherein the first terrain-tracing line has a first line configuration and the second terrain-tracing line has a second line configuration.

20. The method of claim 19, wherein the first and second line configurations are different and each represents sequential, different fixed ranges.

* * * * *